Nov. 2, 1943.   W. F. HELMOND   2,333,566
TYPEWRITING MACHINE
Filed May 20, 1941   3 Sheets-Sheet 1

INVENTOR
WILLIAM F. HELMOND
BY
*C. G. Julihn*
ATTORNEY

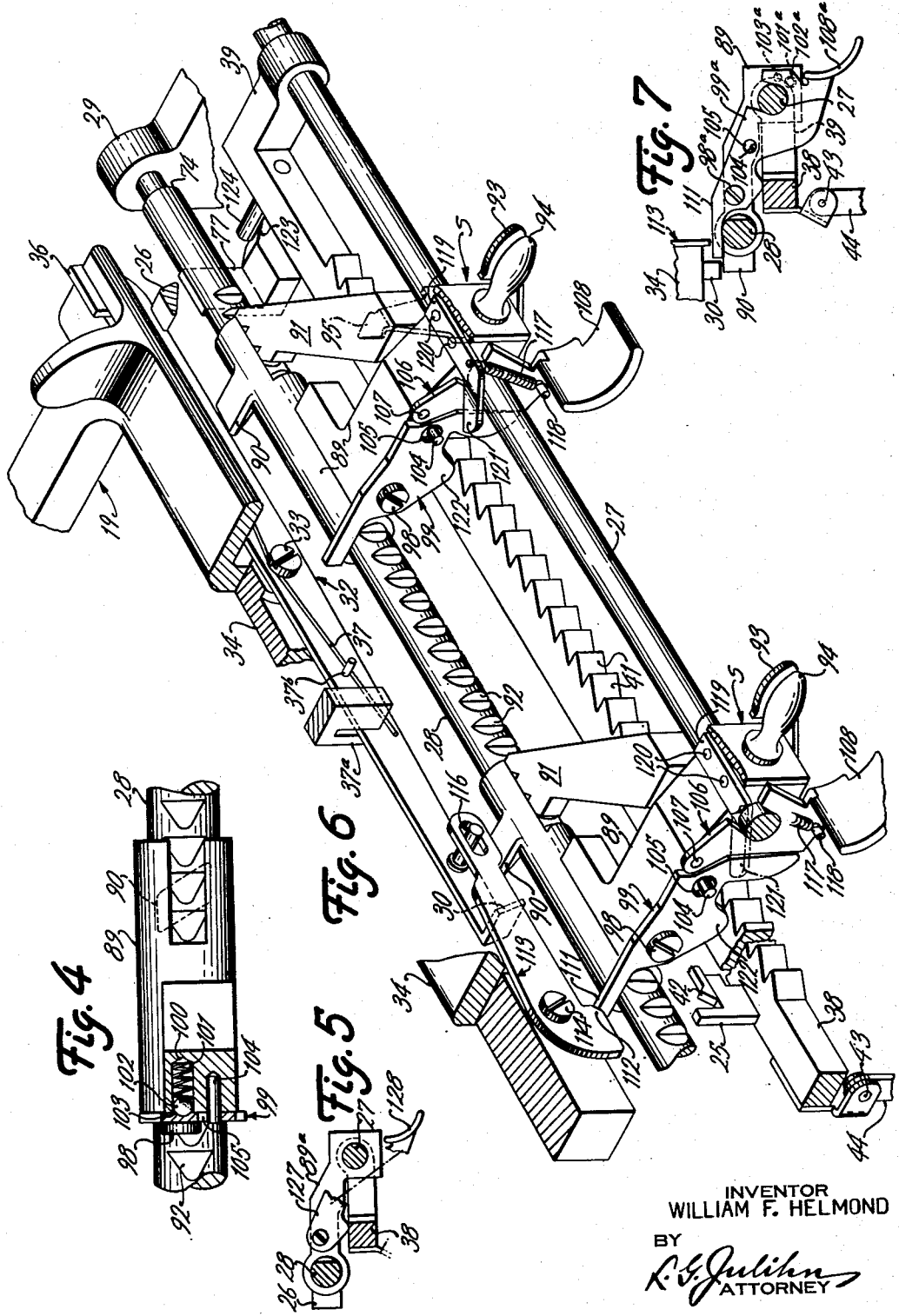

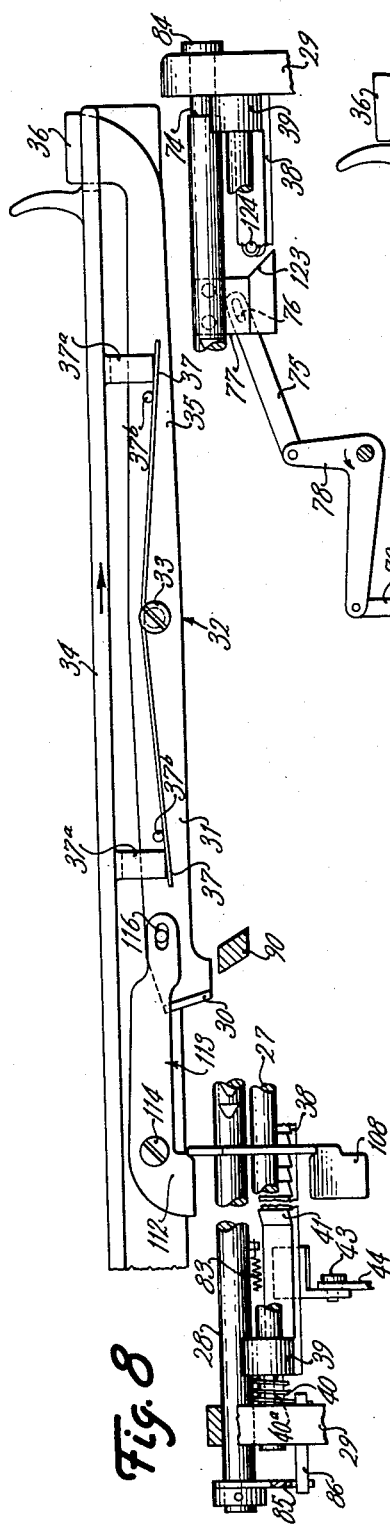

Patented Nov. 2, 1943

2,333,566

UNITED STATES PATENT OFFICE 2,333,566

TYPEWRITING MACHINE

William F. Helmond, Clinton, Conn., assignor to Underwood Elliott Fisher Company, New York, N. Y., a corporation of Delaware Application May 20, 1941, Serial No. 394,302

18 Claims. (Cl. 197—66)

This invention relates to stop-mechanism for gaging the extent of movement of a typing carriage, and is herein shown applied to gaging carriage return movement at will to intermediate line-start positions as distinguished from returning the carriage to an extreme line-start position.

There may be one or more intermediate stops. Each intermediate stop is normally ineffective relatively to a counterstop-device so as to permit the carriage to be returned ordinarily to an extreme position.

Each intermediate stop includes a key, manually operable at will preparatory to a return of the carriage, whereby such intermediate stop and the counterstop device are enabled to cooperate to limit the carriage return to a corresponding intermediate line-start position. Any intermediate stop, together with its key and an element key-operable to enable the intermediate stop to function, are shiftable to different stations in order to establish variably the intermediate line-start position.

The operation of such key of the stop may also cause a power mechanism to function to return the carriage to said stop irrespective of its station.

The features so far indicated also characterize, generally, the stop mechanism disclosed in the W. F. Helmond Patent No. 2,160,251, dated May 30, 1939.

An object of the present invention is to provide a novel stop which may be enabled to function upon operation of its key, but irrespective of manually keeping the key operated until the carriage has been returned to the stop. Therefore, provision is made to keep a stop element, which is key-settable to enable the stop to function, automatically in operated position independently of manually keeping the key in operated position. Thus, by a momentary manual operation of the key as by merely tapping it, effectivity of the normally ineffective stop is determined.

Another object is to provide for automatic restoration of the key-set stop-enabling element after it has served to limit the carriage return to the corresponding intermediate line-start position.

Another object is to effect the restoration of the stop-enabling element by means of the returning carriage and irrespective of the line-start station to which the intermediate stop and such element are adjusted.

Another object is to power-return the carriage in response to operation of the stop key. However, the carriage may also be returned manually in conjunction with the key-determined use of the stop.

Another object is to provide a stop that is durable, efficient, composed of few parts, and readily applicable to existing kinds of typing machines.

Another object is to make use of existing means in present machines to further the purposes of the novel stop mechanism.

The foregoing and other objects, features and advantages will be apparent from the following description and accompanying drawings of a preferred embodiment of the invention.

In said drawings:

Figure 1 is a cross-sectional side elevation of a typing machine and the novel stop mechanism.

Figure 2 is a large-scale cross-sectional side view of the stop mechanism with the parts in normal position.

Figure 3 is a view similar to Figure 2 but showing the stop mechanism in effective condition as determined by operation of the key.

Figure 4 is a fragmentary front view, partly sectioned, of the rear portion of the stop and its support.

Figure 5 is a cross-sectional side view of a stop adapted to limit an extreme carriage return.

Figure 6 is a perspective of the stop mechanism.

Figure 7 is a cross-sectional side view of the stop according to a modification.

Figure 8 is a front view of parts of the stop mechanism, including the enabling element in operated position and engaged by a part on the returning carriage.

Figure 9 is a front view similar to Figure 8 showing the engaged part on the carriage operated to render a counterstop cooperative with the intermediate stop.

Figure 10 is a view similar to Figure 9 and illustrates the parts in their restored position immediately following the return of the carriage to the intermediate stop.

Type bars 15, Figure 1, are operable under control of type keys 16 for typing on a work sheet 17 on a revoluble platen 18 in a carriage 19 movable on guide rails 20 on main frame 21. Carriage-feed-rack 22, escapement wheel 23, escapement dogs 24 and a spring motor, not shown, cooperate to advance the carriage leftward during typing of a line.

Leftward carriage movement is limited by a margin stop 25, partly shown; and return carriage movement is limited by a margin stop 26 partly shown, Figure 6. Said margin stops 25, 26 determine the two extremes of the variable maximum range of carriage travel and correspond to the pair of margin stops usually provided in the typewriter. Front and rear cross rods 27, 28 for supporting the margin stops are supported in standards 29 of main frame 21.

A counterstop 30, to limit the carriage return movement, is at the end of an arm 31 of a lever 32 pivoted on a stud 33 in a front cross member 34 of the carriage frame. An arm 35 of said counterstop lever 32 has a finger piece 36 for rocking said lever from the Figure 10 normal position in which counterstop 30 is in alignment with margin stop 26, to a position in which counterstop 30 is above said margin stop 26 to permit the carriage to be moved rightwardly beyond said margin stop 26. Opposite tails 37 of a spring supported by stud 33 cooperate with abutments 37ª on the carriage frame and pins 37ᵇ in the counterstop lever 32 to keep the latter poised in normal position as in said Patent No. 2,160,251.

The left margin stop 25, Figure 6, bears on a cross bar 38 having end arms 39 fulcrumed on front cross rod 27. A torsion spring 40, Figure 8, engages main frame standard 29 and reacts on a pin 40ª in the left end-arm 39 to urge cross-bar 38 upwardly to normal position. The end of said pin 40ª and the right cross bar arm 39 abut the standards 29 to hold the cross bar 38 laterally. Said cross bar 38 has rack teeth 41 to locate and hold the left margin stop 25 laterally at different stations as set forth in said Patent No. 2,160,251 which also shows a counterstop, herein not shown, projecting from the carriage cross member 34 to engage the left margin stop 25 to limit the leftward movement of the carriage. Said latter counterstop may also engage cam 42 on the left margin stop 25 to rock the latter downwardly about the front cross-rod 27 to depress cross bar 38 for automatically initiating a power driven carriage return movement as the carriage takes the last letter feed step to a line-end of typing.

Referring to the carriage return mechanism, Figure 1, cross bar 38 has pivoted thereto at 43, a thrust rod 44. Depression of cross bar 38 depresses rod 44 to rock a lever 45 pivoted to the main frame at 46 so that said lever by means of a pin-and-slot connection 47 lifts a carriage return trip link 48 to disengage a latch shoulder 49 of the latter from a holding plate 50. The resulting rearward movement of the lifted trip link 48 by a spring 54 acts through an intermediate train to slide a carriage return pinion 51, meshing with a rack 52 on the carriage, rearwardly along a pinion shaft 53 to be clutched to the latter. Said intermediate train includes a rock shaft 56 having a pinion shifter 57 and connected by arm 58, lin 59 and arm 60 to a rock shaft 61 having an arm 62 pivotally connected to trip link 48. Rock shaft 61 has an arm 63 pivoted to a control link 64 that normally holds a spring contact 65 disengaged from a contact 66 so that an electric carriage return motor, not shown, is normally at rest, said contacts forming a motor switch. Rearward movement of trip link 48 permits said contacts to close to start the motor. A motor shaft 67 drives pinion shaft 53 through a worm and gear connection 68.

A carriage-return key lever 69 pivoted to main frame 21 is manually rockable to a stop 70 to engage and pass a pawl 71 on trip link 48 and thereby lift and release the latter from plate 50 to start the carriage return operation. Other details of the mechanism operative at release of trip link 48, to cause a return of the carriage are substantially as shown in aforesaid Patent No. 2,160,251.

Mechanism for ending the carriage return run at a place determined by margin stop 26 is substantially as in said Patent No. 2,160,251. When counterstop 30 on the returning carriage, encounters margin stop 26, the latter is driven rightwardly and, being interlocked with cross rod 28, moves the latter endwise to the right, said cross rod being slidably retained in standards 29 and its rightward movement being limited by a shoulder 74 thereof meeting the right standard 29. By means of a link 75, Figure 8, having a pin-and-slot connection 76 to a bracket 77 fastened to cross rod 28, the rightward movement of the latter rocks a bell crank 78 clockwise of Figure 8 to lift a link 79, Figure 1, rock a lever 80, fulcrumed on main frame 21 and pull down a link 81 connected to shaft 56 to rock the latter clockwise to the Figure 1 position to unclutch the carriage return pinion 51 from the pinion shaft 53. The clockwise rocking of said shaft 56 also rocks shaft 61 counterclockwise to restore trip link 48 forwardly to reengage its latch shoulder 49 with plate 50 and to also restore switch link 64 to open switch contacts 65, 66 for stopping the motor. The pin-and-slot connection 76 in the described train from cross rod 28 to the carriage return pinion 51 permits the latter to move, to clutch shaft 53, independently of said cross rod 28 when the latter is in its normal or leftwardly retracted position. A spring 83 normally keeps said cross rod 28 in its leftwardly retracted position determined by abutment of a headed stop screw 84 in cross rod 28 with right standard 29. A depending fork 85 of cross rod 28 keeps the latter from turning by embracing a pin 86 in left standard 29. Immediately following the arrest of the rightward return of the carriage at disengagement of the carriage return pinion 51, by means of cross rod 28, the carriage has the usual carriage-spring-urged drop-back movement of approximately one letter space due to the usual back-lash in the escapement devices 23, 24, and this drop-back movement of the carriage permits the leftward retraction of rear cross rod 28 by spring 83.

The novel margin stop mechanism for gaging return of the carriage to intermediate positions will now be described.

Figure 6 illustrates the provision of two intermediate carriage-return margin stops or units S besides the extreme carriage return stop 26. However, the number of intermediate stops S provided may vary according to need and they may be alike, except that where several are employed, they are placeable at different stations.

Each unit S includes a body 89 slidably supported by and laterally adjustable along the cross rods 27, 28. A stop lug 90 on the body is below, see Figures 6, 8 and 10, the normal path of the counterstop 30 on the carriage, so that normally the return movement of the latter is limited by the extreme margin stop 26. A lock pawl 91 is pivoted to the body 89 and is spring-pressed to engage teeth 92 of the rear cross rod 28 to locate and hold the unit S laterally at any station. For releasing the unit S for lateral adjustment, the lock pawl 91 may be retracted by means of its finger piece 93. Each stop unit S has a shift handle 94, and it also has a pointer 95 to indicate its station on a letter-space scale 96 on the main frame. The extreme margin stop 26 has a body, lock-pawl, releasing finger piece, shift handle and pointer substantially as above described for the unit S and, like the latter, is adjustable laterally.

Each unit S has a headed stud 98 in the stop body 89 to pivotally support a plate 99 against the side of the body. Body 89 is drilled at 100, Figure 4, to house a detent spring 101 and a detent ball 102 seatable in either one of two depressions 103 in plate 99 for holding said plate in normal position or in operated position. A stop pin 104 in body 89 cooperates with the opposite sides of a suitably larger hole 105 in plate 99 to limit the movements of the latter between said positions.

A key-lever-forming plate 106 is pivoted on a pin 107 in body 89 and has a finger key 108. An operating-arm-edge 109 of key lever 106 cooperates with an edge 110 of plate 99 for turning the latter clockwise from the normal position, Figure 2, to the operated position, Figure 3, by finger operation upon key 108.

In the normal position of plate 99, a tappet-arm 111 thereon is below and hence is out of the path of a cam-arm 112 of a counterstop control lever 113 fulcrumed on a headed stud 114 in carriage cross member 34, said lever 113 having a pin and slot connection 116 to counterstop lever 32.

It will be seen now that, with the carriage in an advanced position so that said cam arm 112 is to the left of the tappet arm 111 of any intermediate stop unit S, operation of the key 108 of such unit turns its plate 99 to operated position so that its tappet arm 111 stands elevated in the path of the counterstop-controlling cam arm 112. Then, if the carriage is returned, the elevated tappet arm 111 will meet and displace the cam arm 112 to turn lever 113 clockwise about stud 114 to turn the counterstop lever 32 counterclockwise about its stud 33, against the force of the spring 37, to depress the carriage counter ter stop 30 into line with the stop lug 90 of the unit so that the latter limits the carriage return movement, substantially as in Figure 9.

Detent device 101—103 sustains tappet plate 99 in operated position against the reaction of thus moving the levers 113, 32 against the force of the spring tails 37, it being understood that said force may be comparatively light.

Therefore, it is unnecessary to hold key 108 manually in operated position until the returning carriage is arrrested by the intermediate stop unit S. A spring 117 attached to a stud 118 of key lever plate 106, may be provided to return the latter alone to normal position as soon as the typist's finger is withdrawn immediately following operation of key 108. A simple tapping or momentary stroke on key 108 serves to move tappet plate 99 to operated position to determine that the corresponding intermediate stop unit S will limit return of the carriage.

Key lever spring 117 may be anchored to a clip 119 fixed to the body 89 at 120. An elbow extension 121 of said clip cooperates with the side of the body 89 to retain the key plate 106 and the tappet plate 99 laterally on the body. Key lever plate 106, urged by spring 117, may stop against cross-rod 27 as in Figure 2 to determine its normal position.

When tappet plate 99 of an intermediate stop unit S is moved to operated position by operation of key 108, a nose 122 on said plate 99 bears on and depresses the universal cross bar 38, and its thrust rod 44, to release carriage return trip link 48. This initiates a power return of the carriage which is terminated as the carriage counter stop 30 meets the stop lug 90 of said unit S, it being remembered that counterstop 30 will be depressed to be enabled to meet said lug 90 because the cam arm 112 on the returning carriage will be engaged and displaced by the elevated tappet arm 111 of the plate 99 detented in set position, Figure 3.

Upon engagement of the depressed counterstop 30 with said stop lug 90, the continuing carriage return movement will move the entire unit S, and hence the cross rod 28, rightwardly. This rightward displacement of cross rod 28, which may be limited by cross rod shoulder 24, operates through the described train, from link 75 to the carriage return pinion shifter 57, to unclutch the carriage return pinion 51 from the pinion shaft 53 and to restore trip link 48 to terminate the power return of the carriage as hereinbefore described with reference to the extreme carriage return stop 26.

This rightward displacement of cross rod 28 operates through a cam 123, Figures 6, 8, 9, 10, provided on cross rod bracket 77, and a cam-engaged pin 124, on the depressed cross bar 38, to elevate the latter to restored position, Figure 2. At such restoration, cross bar 38 works against the nose 122 of tappet arm plate 99 to turn the latter counterclockwise from the operated position, Figure 3, to the normal position, Figure 2. A by-pass and slip-off pawl 126 on thrust rod 44, Figure 1, permits substantially simultaneous but non-interfering restorations of trip link 48 and cross bar 38 at the rightward displacement of cross rod 28 by the returning carriage. Details concerning said pawl 126 will be obvious from Figure 1, and for further description, reference may be had to the aforesaid Patent No. 2,160,251.

Figure 8 represents the relative positions of the parts just when cam arm 112 on the returning carriage meets the tappet arm 111 which stands elevated as a result of the corresponding key 108 having been operated. The continuing return movement of the carriage from the Figure 8 position then causes the cam arm 112, and its lever 113, to be displaced by the elevated tappet arm 111 to depress counterstop 30 into line with stop lug 90. The depression of the counterstop may be completed before said counterstop, moving with the continuing carriage return, meets said stop lever 90. Then the depressed counterstop 30, still under way with the continuing carriage return, moves the entire stop unit S and cross rod 28 rightwardly to unclutch the carriage return pinion 51 from the motor drive and to restore cross bar 38 and tappet arm plate 99 as hereinbefore described. The unclutching of pinion 51 may be completed before the cross rod shoulder 74 meets standard 29 so that when the shoulder does reach said standard, it does so by decelerating momentum of the carriage, in order to avoid undue shock.

Figure 9 represents the relative positions of the parts when the cross rod shoulder 74 meets standard 29. At this stage, although cross bar 38 has been restored upwardly and has restored tappet arm 111 downwardly, the counterstop 30 may still be, for the moment, in a depressed position by reason of its contact with stop lug 90. However, the immediately following hereinbefore described drop-back movement of the carriage may be slightly in excess of the attendant leftward return movement of cross rod 28 and stop lug 90, and this frees the counterstop 30 so that it and its lever 32, and lever 113, become restored to the Figure 10 position by the force of spring 37 as the carriage comes to rest under control of the carriage escapement devices.

Figure 7 shows a modification of a margin stop unit in which a finger key 108ª is integral with a plate 99ª having a tappet arm 111. Said key 108ª is operable manually to move plate 99ª, about headed stud 98ª, to operated position and remains in operated position until restored, together with plate 99ª, by restoration of cross bar 38. Detent devices 101ª, 102ª, 103ª for plate 99ª are similar to those described for plate 99.

The extreme margin stop 26 may have a body 99ª, similar to 99, and there may be associated therewith, as in Figure 5, a plate 127 similar to plate 99 or 99ª except that the tappet arm 111 of the latter is omited. Plate 127 may be operated, about its stud, by means of a key 128 merely to depress cross bar 38 to initiate a power carriage return to said extreme margin stop 26. Plate 127 need not be detented in operated position. The power return of the carriage to the extreme margin stop 26 may be initiated by operating the carriage return key lever 69 on the main frame.

As set forth in aforesaid Patent No. 2,160,251, the cam 42, associated with line-end margin stop 25, may be displaced at will to silence automatic initiation of a power carriage return by the carriage at a line-end, as when it is desired to selectively determine different returns of the carriage by means of the selectively operable keys 108.

None of the keys 108, or 108ª, need be held down manually during power return of the carriage. Further, any key-operated tappet-arm, like 111, will be automatically restored after cooperating to determine the limit of the corresponding carriage return and the restoration will be effected automatically irrespective of the station at which the stop unit S is placed. Hence, any stop unit S is freely adjustable to and will serve at any station in its range.

Variations may be resorted to within the scope of the invention, and portions of the improvements may be used without others.

What is claimed is:

1. In a typing machine; the combination of a laterally movable carriage, a stop-unit adjustable to different carriage-movement-limiting stations, a counterstop, said unit and counterstop being relatively movable and normally relatively positioned so as to be ineffective to operate, a key on said unit, means, including a device on said unit settable by operation of said key, to enable the carriage to move and relatively position said unit and counterstop so that they may cooperate to limit the carriage movement at the station for which the unit is adjusted, and means operable automatically under control of the carriage to restore said settable device consonantly with said unit and counterstop having cooperated to limit the carriage movement.

2. In a typing machine; the combination of a laterally movable carriage having a transversely movable stop, a stop-unit adjustable to different carriage-movement-limiting stations but normally ineffective at any station to engage the carriage stop to limit the carriage movement, a key on said unit, a device on said unit settable by operation of said key to determine movement of the carriage stop so that said unit may engage the carriage stop to limit the carriage movement at the station for which the unit is set, and means operable automatically under control of the carriage to restore said device consonantly with said unit having served to limit the carriage movement.

3. In a typing machine; the combination of a laterally movable carriage having a transversely movable stop, a stop-unit adjustable to different carriage-movement-limiting stations but normally ineffective at any station to engage the carriage stop to limit the carriage movement, a key on said unit, a device on said unit settable by operation of said key to determine movement of the carriage stop so that said unit may engage the carriage stop to limit the carriage movement at the station for which the unit is set, means automatically detenting said device in set position irrespectively of sustained manual operation of said key, and means operable automatically under control of the carriage to effect restoration of said device consonantly with said unit having served to limit the carriage movement.

4. The combination with a laterally movable typing machine carriage, of a stop-unit adjustable to different carriage-movement-limiting stations but normally ineffective at any station to limit the carriage movement; said unit including a key and a device settable by manual operation of said key to determine that the unit may limit the carriage movement, said unit being limitedly displaceable by the carriage in limiting the carriage movement, and means operable by such displacement of the unit to restore said device.

5. The combination with a laterally movable typing machine carriage, of a stop-unit adjustable to different carriage-movement-limiting stations but normally ineffective at any station to limit the carriage movement; said unit including a key and a device settable by manual operation of said key to determine that the unit may limit the carriage movement, said unit being limitedly displaceable by the carriage as the unit limits the carriage movement, an element connected to said unit for displacement therewith, and means operable by such displacement of said element to restore said device.

6. The combination with a typing machine carriage, of a manually operable key adjustable to different stations in the range of carriage travel, a device settable by operation of said key at any station, normally ineffective stop-means for the carriage, a part on the carriage engageable with the set device to make the stop-means effective so that subsequent movement of the carriage will be limited at said station, and means controlled by the carriage to restore said device consonantly with said stop-means having served to limit the carriage movement.

7. The combination with a support and a typing carriage thereon, of two stops, on the support and carriage, respectively, normally out of cooperative alignment but relatively movable into alignment for limiting the carriage movement, means supporting one of said stops for adjustment to different stations in the range of carriage movement, a key adjustable along with said adjustable stop, a device settable by operation of the key at any station, means engageable with the set device to align said stops, and means operable, in response to the engagement of said stops in limiting the carriage movement, to restore said device.

8. The combination with a laterally movable carriage, of a stop-unit laterally adjustable to different carriage-movement-limiting stations, a movable counterstop associated with the carriage and normally out of operative relation with said unit, a key on said unit, an engageable part associated with said counterstop, an element on said unit settable into position by operation of said key for engaging said part and moving said counterstop into operative relation with said unit by movement of the carriage preceding arrival of the carriage at the station of the unit, and means operable under control of the carriage to restore finally said element.

9. The combination with a laterally movable carriage, of a stop-unit adjustable to different carriage-movement-limiting stations, an element movably mounted on said unit so as to be settable to an operated position to determine effectivity of said unit for limiting carriage movement, means on said unit to retain said element in said position, said unit being limitedly displaceable consonantly with the unit-limiting the carriage movement, and means operable by such displacement of said unit to effect restoration of said element.

10. The combination with a laterally movable carriage, of a stop-unit adjustable to different carriage-movement-limiting stations, a key on said unit, an element on said unit settable to a position by operation of said key to determine effectivity of said unit, a member paralleling the adjustment range of said unit and operable to engage and restore said element at any station of the unit, and means cooperable with the carriage to operate said member.

11. The combination with a laterally movable carriage, of a support, a stop-unit adjustable along the support to different carriage-movement-limiting stations, a key on said unit, an element on said unit settable to a position by operation of said key to determine effectivity of said unit, said unit and support being displaceable from a normal position by the carriage in cooperating to limit the carriage movement, a member paralleling the adjustment range of said unit and operable to engage and restore said element at any station of the unit, and means operatively connecting said member and support for operating said member by the displacement of said support.

12. The combination with a carriage, and power means for moving said carriage laterally, of a stop-unit adjustable to different carriage-movement-limiting stations, a key on said unit, an element on said unit settable to a position by operation of said key to determine effectivity of said unit, a member paralleling the adjustment range of said unit and connected so as to be operable concomitantly with the setting of said element by said key to initiate movement of the carriage by said power means, said member being also operable to restore said element, and means cooperable with the carriage and unit to shut off said power means and to operate said member to restore said element.

13. The combination with a carriage, and power means for moving said carriage laterally, of a stop-unit adjustable to different carriage-movement-limiting stations, a key on said unit, an element on said unit settable to a position by operation of said key to determine effectivity of said unit, a member paralleling the adjustment range of said unit and connected so as to be operable concomitantly with the setting of said element by said key to initiate movement of the carriage by said power means, said member being also operable to restore said element, said unit being displaceable from a normal position by the carriage in cooperating to limit the carriage movement, and means operatively connecting said member and unit so that the displacement of the latter operates said member to restore said element.

14. The combination with an advanceable carriage, and power mechanism for returning said carriage, of a stop-unit adjustable to different carriage-return-limiting stations, a key on said unit, an element on said unit settable to a position by operation of said key to determine effectivity of said unit, means operable concomitantly with the key setting of said element to initiate return of the carriage by said power mechanism, and means cooperable with said carriage and unit to shut off said power mechanism and restore said element.

15. The combination with an advanceable carriage, and power mechanism for returning said carriage, of a support, a stop-unit adjustable along said support to different carriage-return-limiting stations, a key on said unit, an element on said unit settable to a position by operation of said key to determine effectivity of said unit, a member paralleling the adjustment range of said unit and operable one way by the setting of said element to initiate return of said carriage by said power mechanism, said support and unit being laterally displaceable in cooperating to limit the carriage return, said member being operable also another way to restore said element, means operable by the displacement of said support to shut off the power mechanism, and an operative connection between said support and member whereby the displacement of the support operates said member to restore said element.

16. The combination with an advanceable carriage, and power mechanism for returning said carriage, of stop means, including a key, mounted for adjustment to different carriage-return-limiting stations, and conditionable by operation of the key for cooperating to limit the carriage return, a member paralleling the adjustment range of said stop means and operable jointly with the conditioning of said stop means to initiate a return of the carriage by said power mechanism, and means cooperative with said carriage and stop means to shut off the power mechanism, said member being also cooperable with said carriage and stop means to restore said stop means to ineffective condition.

17. In combination, a frame, a carriage laterally movable thereon, a stop-unit laterally adjustable on the frame to different carriage-movement-limiting stations, a counterstop on the carriage normally out of alignment with the stop-unit, a lever on the carriage operable to move the counterstop into alignment with the stop-unit, an element on the stop-unit, a key on the stop-unit operable to set said element to a position in the path of said lever to operate said lever by the movement of the carriage, said stop-unit being supported so as to be displaced as it cooperates with said counterstop to limit the carriage movement, and means operated by the displacement of said stop-unit to restore said element.

18. The combination with a laterally traveling carriage, of a stop on the carriage movable transversely of the direction of carriage travel, a stop-unit complementary to the carriage stop, means mounting said stop-unit for adjustment to different stations in the range of carriage travel, the carriage stop being normally out of line with the stop-unit, an element on the stop-unit settable from an idle position to an operated position, means cooperative with the set element to determine movement of the carriage stop into line with the stop-unit preparatoy to limiting the carriage movement at the station of the stop-unit, means displaced at cooperation of the carriage stop and stop-unit in limiting the carriage movement, and means responsive to the displacement of said last-named means to restore the set element to idle position.

WILLIAM F. HELMOND.

CERTIFICATE OF CORRECTION.

Patent No. 2,333,566. November 2, 1943.

WILLIAM F. HELMOND.

It is hereby certified that error appears in the printed specification of the above numbered patent requiring correction as follows: Page 4, first column, line 54, claim 1, for "operate" read --cooperate--; page 6, first column, line 7, claim 18, for "preparatoy" read --preparatory--; and that the said Letters Patent should be read with this correction therein that the same may conform to the record of the case in the Patent Office.

Signed and sealed this 15th day of August, A. D. 1944.

Leslie Frazer (Seal) Acting Commissioner of Patents.